(No Model.) 7 Sheets—Sheet 1.
F. A. PRATT.
MACHINE FOR CUTTING OFF BARS OF METAL.
No. 504,171. Patented Aug. 29, 1893.

Witnesses:
H. Mallner
Fred J. Dole.

Inventor:
F. A. Pratt,
By his Attorney,
F. H. Richards (No Model.) 7 Sheets—Sheet 2.
F. A. PRATT.
MACHINE FOR CUTTING OFF BARS OF METAL.
No. 504,171. Patented Aug. 29, 1893.
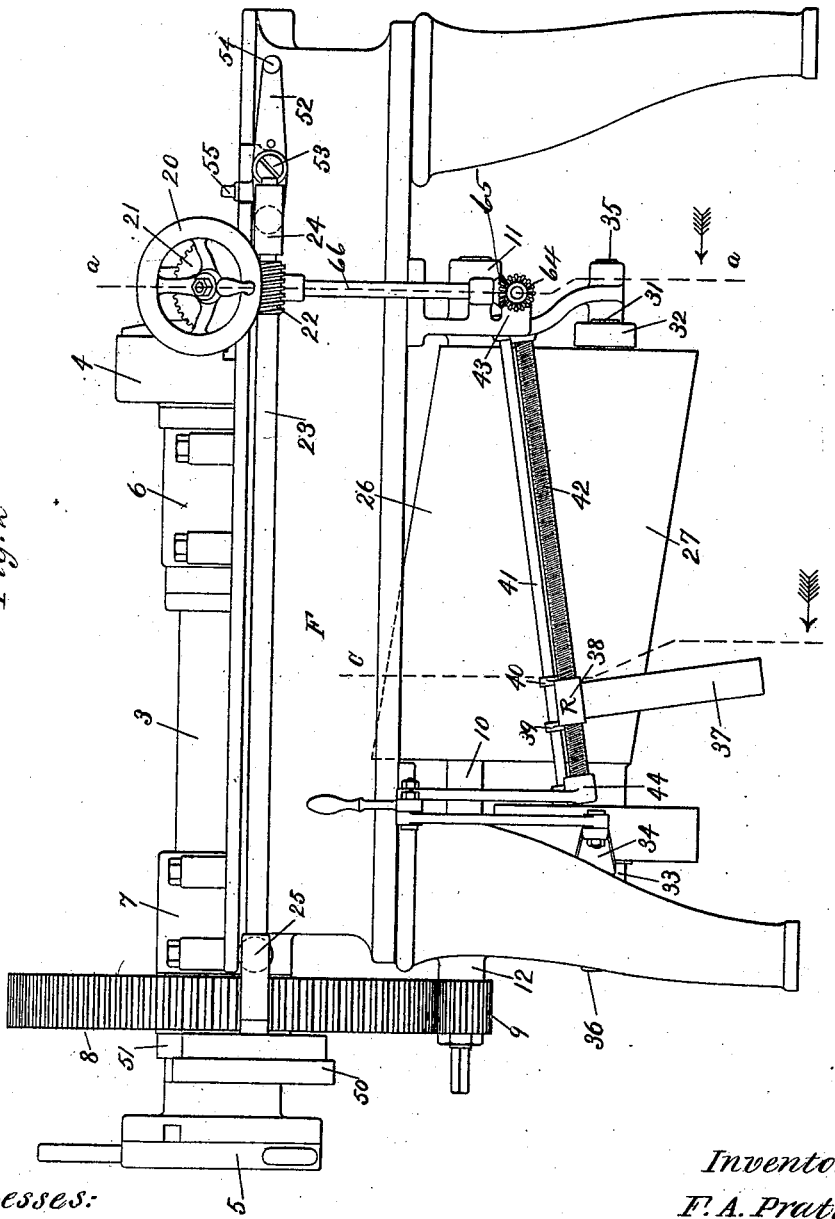
Witnesses:
H. Mallner
Fred J. Dole.
Inventor:
F. A. Pratt,
By his Attorney,
F. H. Richards (No Model.) 7 Sheets—Sheet 3.

F. A. PRATT.
MACHINE FOR CUTTING OFF BARS OF METAL.

No. 504,171. Patented Aug. 29, 1893.

Witnesses:
H. Mallner
Fred J. Dole.

Inventor:
F. A. Pratt,
By his Attorney,
F H Richards

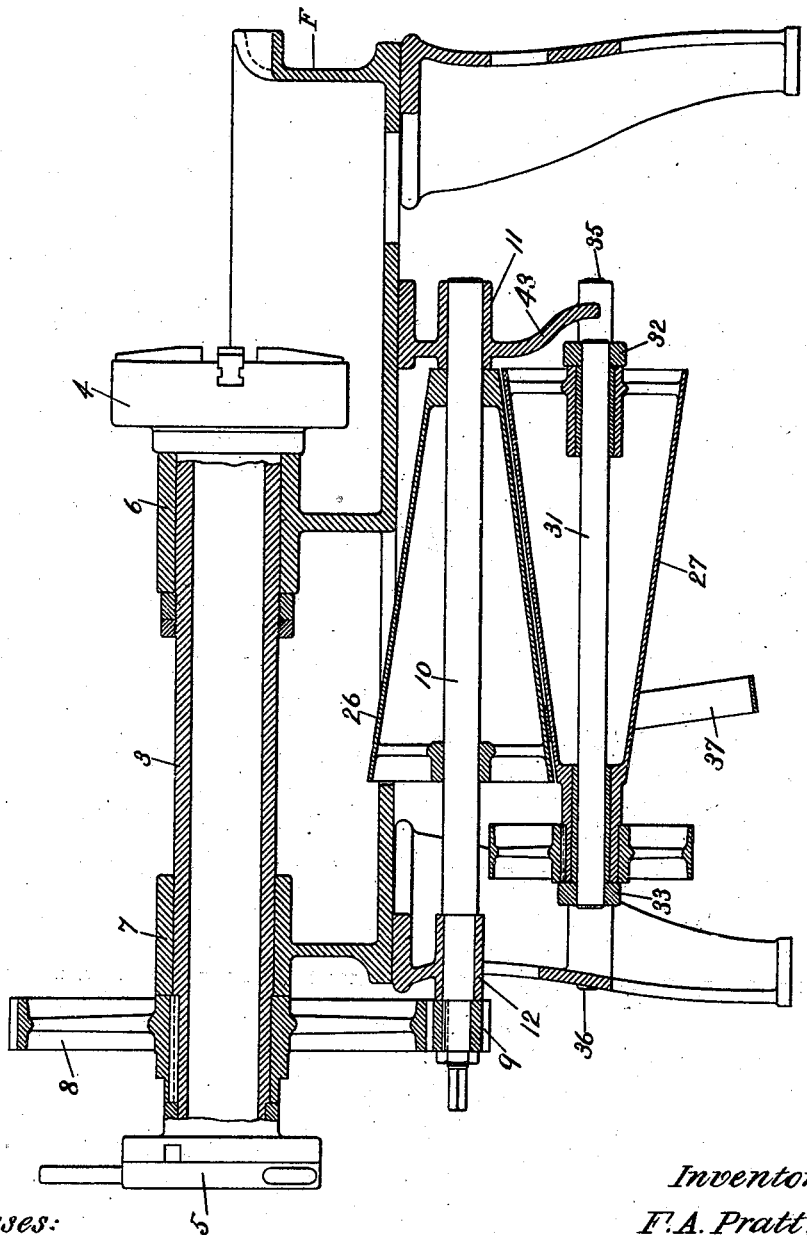

(No Model.) 7 Sheets—Sheet 5.

F. A. PRATT.
MACHINE FOR CUTTING OFF BARS OF METAL.

No. 504,171. Patented Aug. 29, 1893.

Witnesses:
H. Mallner.
Fred J. Dole.

Inventor:
F. A. Pratt,
By his Attorney,
F. H. Richards (No Model.) 7 Sheets—Sheet 6.

F. A. PRATT.
MACHINE FOR CUTTING OFF BARS OF METAL.

No. 504,171. Patented Aug. 29, 1893.

Inventor:
F. A. Pratt,
By his Attorney,
F. H. Richards

Witnesses:
H. Mallner
Fred. J. Dole.

(No Model.) 7 Sheets—Sheet 7.
F. A. PRATT.
MACHINE FOR CUTTING OFF BARS OF METAL.
No. 504,171. Patented Aug. 29, 1893.
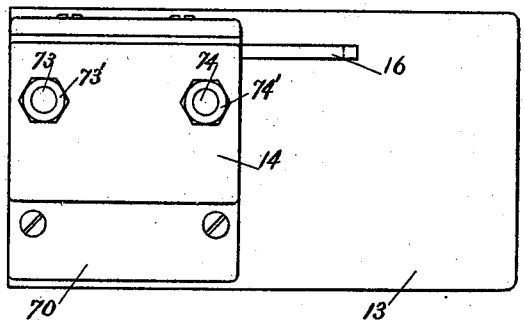
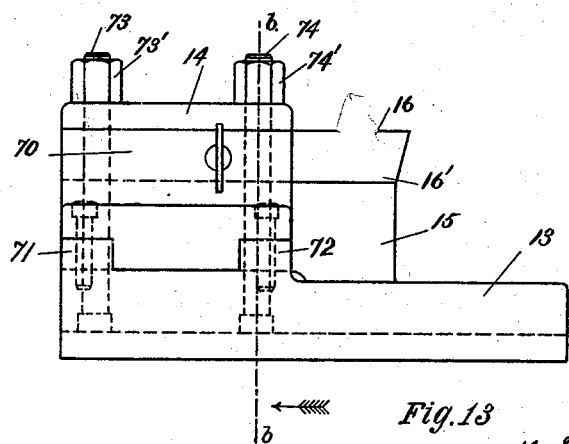
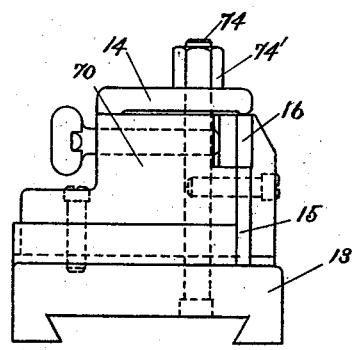
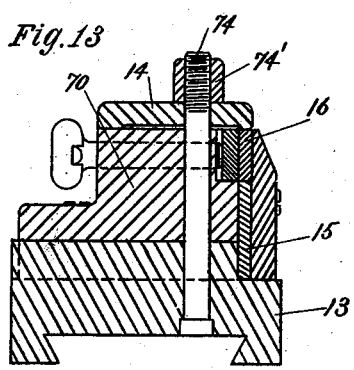
Witnesses.
George E. Mills
Fred J. Dole.
Inventor:
F. A. Pratt.
By his Attorney.
F. H. Richards

UNITED STATES PATENT OFFICE.

FRANCIS A. PRATT, OF HARTFORD, CONNECTICUT, ASSIGNOR TO THE PRATT & WHITNEY COMPANY, OF SAME PLACE.

MACHINE FOR CUTTING OFF BARS OF METAL.

SPECIFICATION forming part of Letters Patent No. 504,171, dated August 29, 1893.

Application filed January 23, 1893. Serial No. 459,417. (No model.)

*To all whom it may concern:*

Be it known that I, FRANCIS A. PRATT, a citizen of the United States, residing at Hartford, in the county of Hartford and State of Connecticut, have invented certain new and useful Improvements in Machines for Cutting Off Bars of Metal, of which the following is a specification.

This invention relates to machines for cutting-off bars of metal by means of a turning-tool operating from the outside toward the center of the revolving bar.

The object of the invention is to furnish an improved cutting-off machine of that class adapted for revolving the bar at a varying speed according to the nearness of the cutting-off tool to the axis of rotation, and to gradually increase the spindle speed as the tool approaches the spindle axes, thereby maintaining within narrow limits, the proper speed of the cutting tool throughout the operation.

Figure 1:
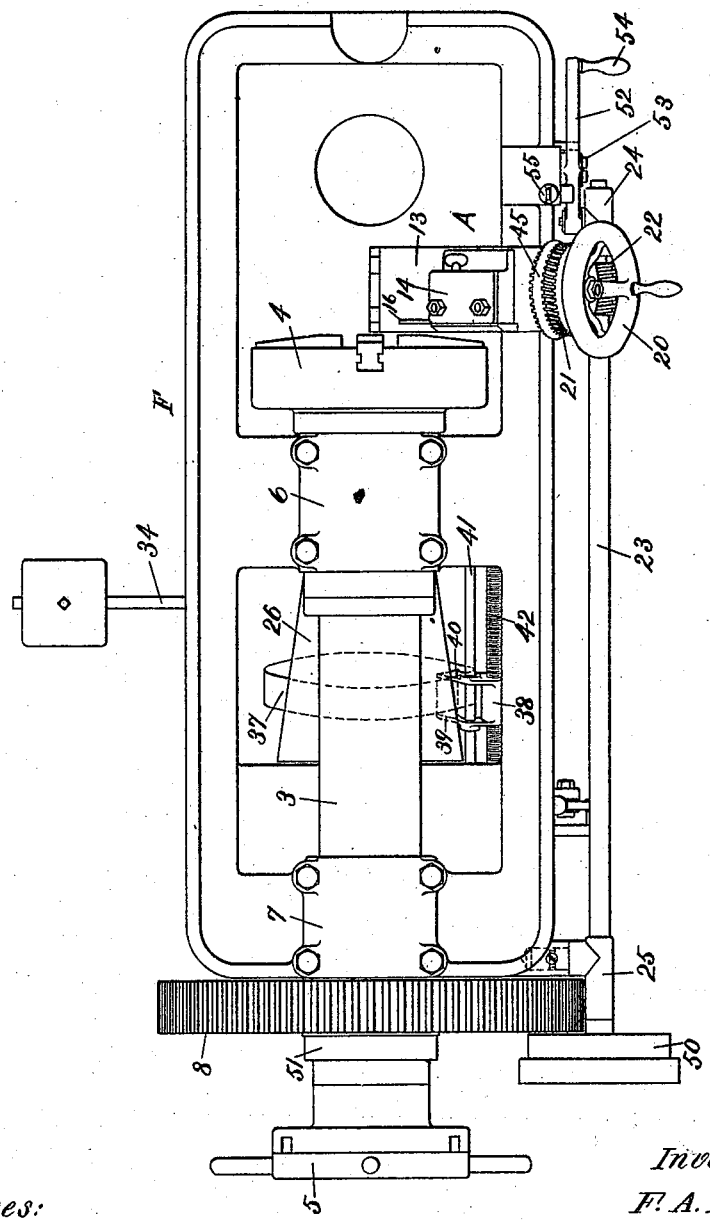
Figure 4:
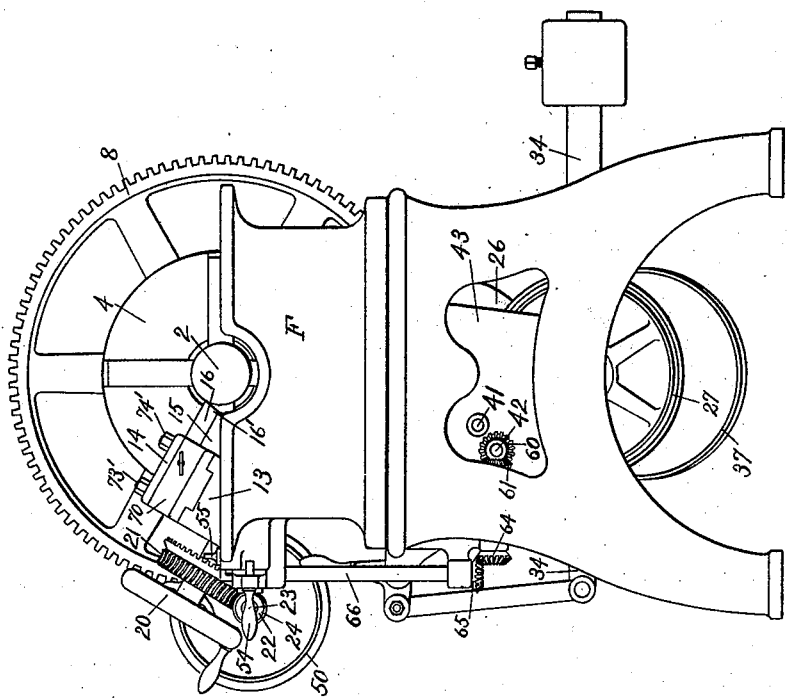
Figure 3:
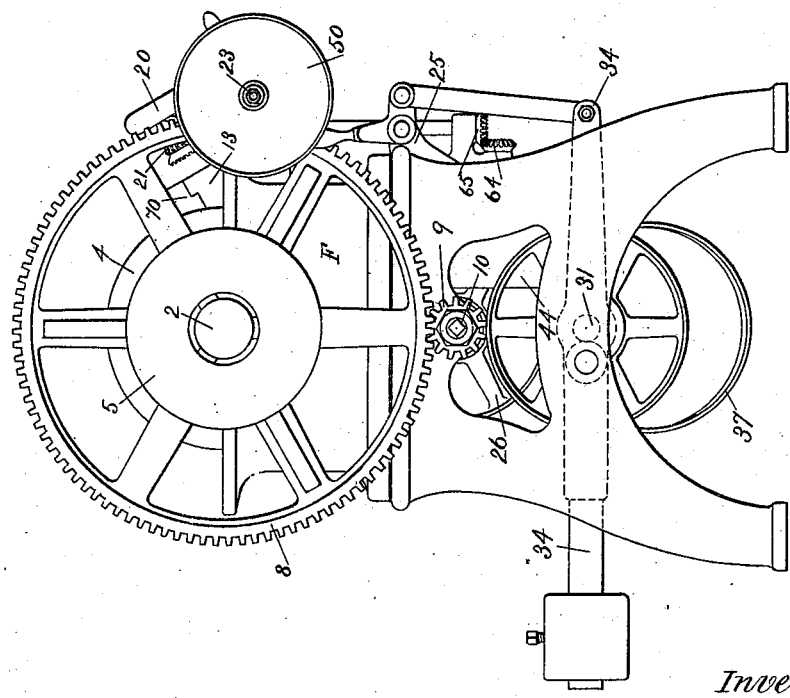
Figure 6:
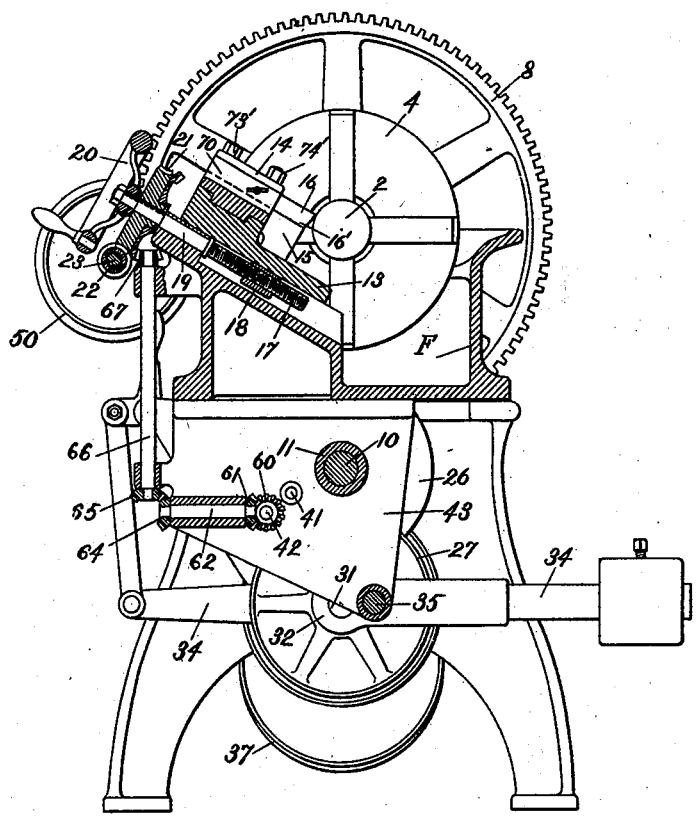
Figure 7:
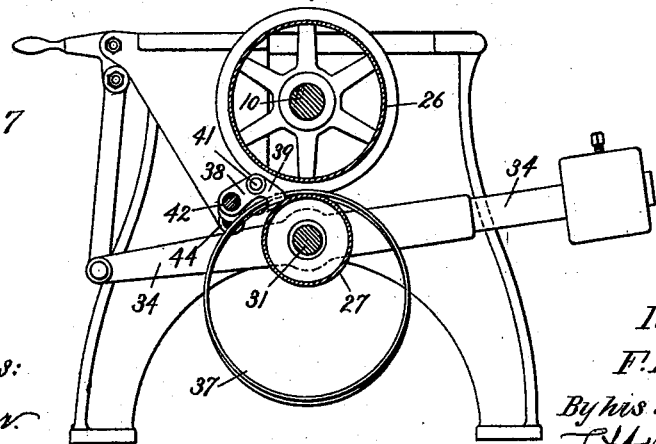
Figure 8:
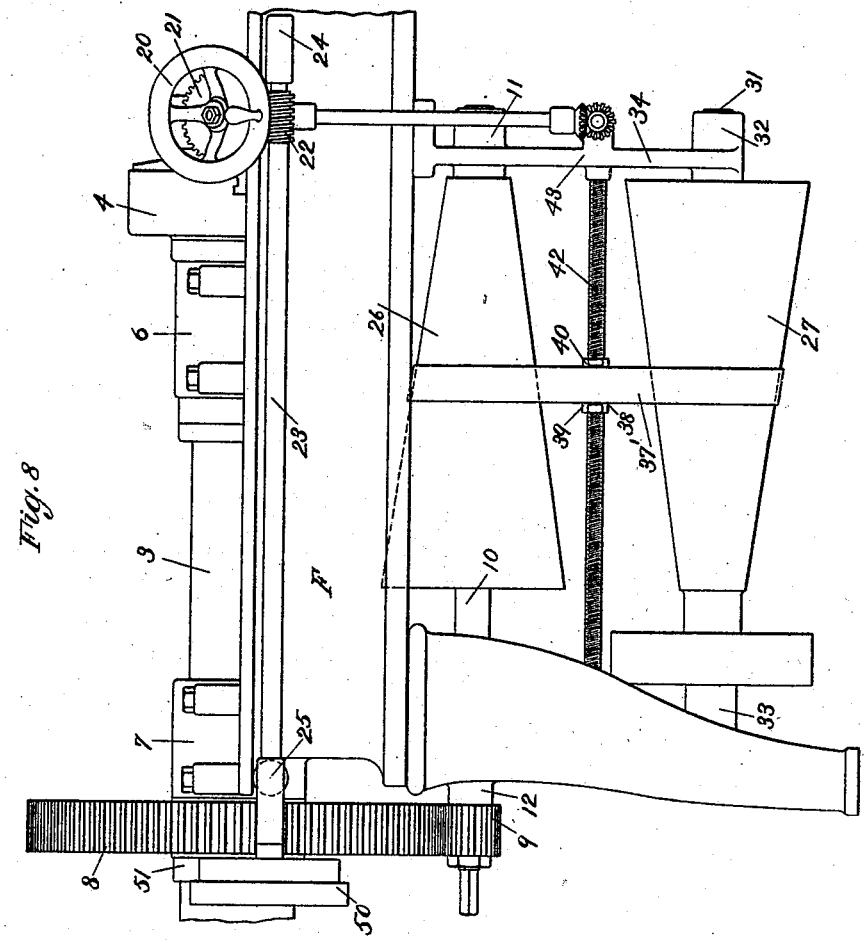
Figure 9:
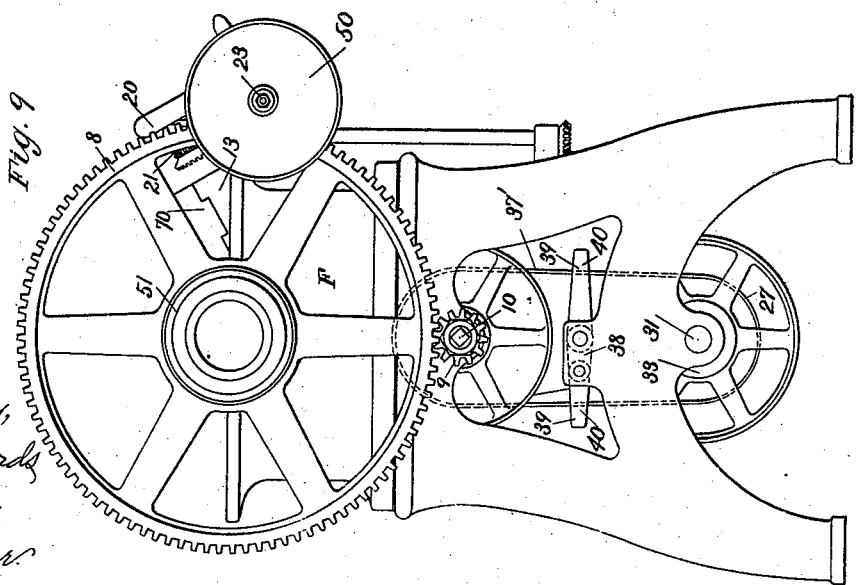

In the drawings accompanying and forming a part of this specification, Figure 1 is a plan view of a cutting off machine embodying my present invention. Fig. 2 is a front elevation of the cutting-off machine. Fig. 3 is an end elevation of the machine, as seen from the left hand in Fig. 2. Fig. 4 is an end elevation of the machine, as seen from the right hand in Fig. 2. Fig. 5 is a longitudinal vertical section of the machine. Fig. 6 is a vertical transverse sectional view in line $a\ a$ Fig. 2. Fig. 7 is a sectional view through the speed-changing-driving mechanism, in line $c$ $c$, Fig. 2, and is illustrative of certain features of the operation of said mechanism. Fig. 8 is a view similar to a portion of Fig. 2, illustrating a modification of the speed-changing-driving mechanism. Fig. 9 is an end elevation of the modification shown in Fig. 8, as seen from the left hand in said figure. Fig. 10 is an enlarged plan view of the tool carriage. Fig. 11 is a side elevation of the tool carriage, corresponding to the view of the same in Figs. 4 and 6. Fig. 12 is an elevation of the inner end of the tool carriage, as seen from the right hand in Figs. 10 and 11. Fig. 13 is a sectional view of the carriage, in line $b\ b$, Fig. 11.

Similar characters designate like parts in all of the figures.

The improved cutting-off machine herein shown and described, is intended for use in cutting off round bars of iron and steel or of other metals, by means of that class of turning tools usually designated "cutting-off" tools, these being supported upon a tool holding carriage constructed and arranged to be fed to the work by means of feed mechanism operated from the driving mechanism of the machine. The bar, 2, Fig. 4, is supported within the hollow spindle 3 of the machine; which spindle is shown provided with suitable chucks designated in a general way by 4 and 5 respectively; the chuck 4 is shown carried on the front end of the spindle, and the other chuck 5 on the back end of the spindle. These chucks may be of any well known kind now commonly used on cutting-off machines. Hence I need not describe in detail the construction of the same. The spindle 3 is shown supported in two ordinary spindle bearings 6 and 7, on the main frame of the machine, this frame being designated in a general way by F. As a means for revolving the spindle and its aforesaid chucks carrying the bar to be cut off, said spindle is shown furnished with the driving pinion 9 of an intermediate shaft 10, which is carried in the bearings 11 and 12, see Figs. 2 and 5. Said intermediate shaft is driven by means of a speed changing driving mechanism, whose regulating element (this being in the present instance a band carrier) is operatively connected with the tool holding slide or carriage. Through this connection the spindle and its connecting gearing, the tool carrier and its feed devices, and the speed changing driving mechanism are organized into an operative combination which embodies the principal feature of my present invention.

The tool carrying apparatus is designated in a general way by A and consists of a carriage or slide, a tool holding clamp, means for operating said clamp, and means for holding the slide in place in its bearings on the main frame F. In detail, in the preferred form thereof herein shown, the tool carriage consists of any suitable sliding carriage as

13, supported on the bed A of the machine to have movements toward and from the axis (prolonged) of the work holding spindle 3. On said sliding carriage is placed the clamp block 70 which is fitted between the guides 71 and 72 (Fig. 11), that hold the same in place lengthwise of the carriage. In one side of said block is formed a recess for receiving the cutting-off blade 16, which consists of a substantially flat blade suitably relieved on the side in a well known manner and projecting forward of the clamp block a distance equal to the greatest depth of the cuts to be made by the machine. On the clamp block 70 is placed the tool clamp 14, which is held down by the nuts 73' and 74' of the bolts 73 and 74, that extend downward through the clamp block 70 into the carriage 13, thereby, when said nuts are tightened, holding all of the parts firmly together. The tool 16, at its projecting end, is supported by the blade supporting gage 15, which is rigidly fixed on the carriage and extends forward to the proper point for locating the lower corner 16' of the cutting off blade. By this means said blade may always be set, after it has been removed for regrinding, in substantially the same position relatively to the carriage. And since said carriage always corresponds in its movements with the movements of the aforesaid band carrier, (this by reason of the connecting shafts and gearing permanently and operatively connecting said carrier and carriage,) it follows that by thus always setting the point of the cutting off blade at the same position on the carriage, this blade will always approach the axis of the work holding spindle with a movement that shall always bear the same relation to the increasing speed of said spindle.

As a means for feeding the tool carriage by hand, and for connecting the same with the automatic feed mechanism, the machine is provided with the feed screw 17 which meshes with the nut 18 fixed on said carriage, and is carried by the bearing 19, on the main frame F. For turning the feed screw by hand, this is provided with the usual hand wheel 20, and for turning the same by power, it is provided with the worm wheel 21 fixed thereon and meshing with the worm 22 of the intermediate feed shaft 23; this shaft is supported in bearings 24 and 25, and is actuated by means of a belt (not shown) from the driven pulley 50 on said shaft to the driving pulley 51 on the main spindle 3. The feed shaft bearing 24 is shown carried on one end of a lever, 52, which is pivotally supported on the main frame F by means of the stud 53, and is provided with a handle 54, whereby to elevate said bearing by hand. For holding the feed shaft up to engage its worm 22 with the aforesaid worm wheel 21, some suitable spring catch is provided for locking the lever 52 in the position thereof shown in Figs. 2 and 4; and for detaching said spring catch (which is supposed to be contained in a hole in the frame F, after a well known manner) said catch device is furnished with the thumb piece 55, whereby to disengage the catch for stopping the feed movement of the tool carriage.

The several parts comprising the feed shaft 23, bearings 24 and 25, pulleys 50 and 51, feed screw 17, nut 18, the worm wheel 21 and worm 22, the lever 52, stud 53, the spring catch referred to and its thumb piece 55, these several parts, being all old and well known, will be understood by those acquainted with this class of machinery without a more particular description.

The preferred driving mechanism shown in Figs. 1 to 7 inclusive, comprises the two oppositely disposed conical pulleys 26 and 27, one operatively connected with the spindle 3 to be driven, the other operatively connected with the source of power, and having intermediate thereto a driving element through which the driven conical pulley 26 is actuated from the driving conical pulley 27. Said driven conical pulley is shown carried by the shaft 10, which is supported in bearings 11 and 12 and is operatively connected by means of the ordinary train of gearing, comprising the pinion 9 on said conical pulley shaft, meshing with the aforesaid driven gear 8 on the main spindle 3.

The driving conical pulley 27 is shown carried by a shaft 31, which is supported in bearings at 32 and 33, on the adjusting frame 34 that is supported by pivots 35 and 36, whereon the frame is adapted to be swung for carrying the driving pulley 27 toward or from the driven pulley 26, for the purpose of releasing or engaging as may be required the friction band or ring 37 between said pulleys. Said belt or driving band 37 (in Figs. 1 to 7 inclusive) is in the form of a loose ring larger than the driving pulley 27 from which it is suspended.

For the purpose of shifting the driving band 37 lengthwise of the conical pulleys, a regulating element designated in a general way by R, is provided. In the preferred form thereof herein shown, said regulator R comprises the band shifter 38 having the fingers 39 and 40 inclosing the band between them. Said band shifter is shown carried by a guide rod 41, which is supported at the ends thereof by the bearings 43 and 44 of the frame-work; and by the traveling-screw 42. For sliding the band-shifter 38 on its guides, the traveling-screw 42 is arranged parallel to the guide-rod and engages with a screw-thread formed in said shifter. The screw 42 is carried in bearings 43 and 44, and is shown operatively connected with the aforesaid feed screw 17 of the tool carriage by means of the bevel-gears 60, 61, intermediate shaft 62, gears 64, 65, shaft 66, and the pinion 67 meshing with the gear 45 fixed on the feed-screw 17.

On account of the coincident movements of the tool carriage and belt-shifter, it is necessary in practice (as I have already set forth)

to have the cutting edge of the tool set always to the same point substantially on said carriage, so that each time the tool approaches the axis of the spindle, the increase of the speed of the spindle will properly correspond thereto. Also on account of the thin tools necessarily used, and the considerable distance the tool has to project from its holder, it is desirable to have a support for the tool. According to my present improvement I provide such a support which also serves as a tool gage, or tool-setting gage, whereby to locate the tool on its carriage always in the correct position. Said support and gage consists of the plate or supporting wall 15, rigidly fixed on the carriage and extending forward to the proper point on the lower front corner 16' of the tool, (see Figs. 10, 11, 12, and 13.) The tool being necessarily ground at substantially the same angle, (for any particular metal,) by setting the tool so its lower corner 16' coincides with the forward end of the supporting plate 15, the cutting edge of the tool is thereby properly located relatively to the carriage, without the use of any special or removable stop or gage therefor. The tool supporting gage plate 15 should coincide in thickness with the lower edge of the cutting off tool, this tool being relieved on its sides in the usual manner; the gage plate being thus constructed enters freely into the cut or kerf made by the tool so as to support said tool throughout its entire working stroke.

The speed changing driving mechanism may, as hereinbefore stated, be varied in its construction from the organization thereof shown in Figs. 1 to 7, inclusive. For instance, the conical pulley may be further separated as shown in Figs. 8 and 9, and the driving band, instead of being a friction ring as in the former case, may be an ordinary driving belt, 37', running over both of said pulleys 26 and 27. In this arrangement of the mechanism, the band carrier traveling screw 42 may be set, as shown in Fig. 8, parallel with the shafts 10 and 31, and the carrier 38 may be provided with two sets of band guiding fingers, one for each run of the band, as illustrated in Fig. 9.

The manner of operatively connecting the screw 42 with the feed screw of the tool carriage, is or may be the same in the modification shown in Figs. 8 and 9 as it is in the mechanism shown in the preceding figures of drawings.

The tool-holder and the cutting tool and gage therefor, herein described, are not broadly claimed in the present application as they constitute the subject-matter of a separate application, Serial No. 479,572, filed by me July 5, 1893, and to which reference may be had.

Having thus described my invention, I claim—

1. In a cutting-off machine, the combination with the frame, the main spindle and tool-carriage, of a speed-changing driving-mechanism, comprising a conical-pulley supported in stationary bearings on the frame, and an oppositely-disposed conical-pulley supported in bearings upon an independent frame pivotally-supported by the frame of the machine, a driving-band, a band-shifter journaled at its ends in the frame and engaging the band for moving it longitudinally of the pulleys, and a speed-regulating-mechanism, comprising a feed-screw in engagement with the tool-carriage a bevel gear secured to said screw, a bevel gear secured to the band-shifting-screw, and interposed speed-regulating-gearing in direct connection with said bevel gears, substantially as and for the purpose described.

2. In a cutting-off machine, the combination with the frame, the main spindle and with a tool-carriage, of a speed-changing-driving-mechanism operatively connected for driving the spindle, and comprising two oppositely-disposed conical-pulleys, one of which is supported in stationary bearings in the frame, and the other of which is adjustably-supported with relation to said frame, a weighted independent frame having bearings which support the adjustable conical-pulley, and pivoted at one side of the pulley-bearings to the frame of the machine, and having means whereby the relative positions of the pulleys may be changed, a driving-band intermediate to said pulleys, a band-guide for shifting the band longitudinally upon the pulleys, a feed-mechanism for operating the tool-carriage, and actuating-mechanism operatively connecting the tool-carriage and band-guide whereby said carriage and guide have corresponding movements substantially as described.

3. In a cutting-off machine, the combination with the work-holding-spindle, of the tool-carriage and its cutting-off tool, the speed-changing-driving-mechanism operatively connected for driving the spindle and comprising speed-regulating elements substantially as described, the tool-setting and supporting-gage upon said carriage underneath the cutting-off tool to enable the tool to be set in proper relation to the coincident movements of the tool-carriage, and speed-changing-mechanism, and connecting mechanism intermediate to the tool-carriage and speed-regulating element, whereby the position of the tool on the carriage may be maintained in proper adjustment to, and coincide in its movements with, the carriage and feed-changing-mechanism, substantially as described.

FRANCIS A. PRATT.

Witnesses:
FRANCIS H. RICHARDS,
J. E. SPALDING.